United States Patent
Gottumukkala

(10) Patent No.: US 10,935,268 B2
(45) Date of Patent: Mar. 2, 2021

(54) HVAC SYSTEM CONTROLLER AND METHOD FOR OBTAINING ENVIRONMENTAL DATA FOR HVAC SYSTEM

(71) Applicant: CARRIER CORPORATION, Palm Beach Gardens, FL (US)

(72) Inventor: Pradeep Kumar Gottumukkala, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 34 days.

(21) Appl. No.: 16/373,687

(22) Filed: Apr. 3, 2019

(65) Prior Publication Data

US 2019/0301760 A1    Oct. 3, 2019

(30) Foreign Application Priority Data

Apr. 3, 2018 (IN) .............................. 201811012727

(51) Int. Cl.
| | | |
|---|---|---|
| *F24F 11/38* | (2018.01) | |
| *F24F 11/58* | (2018.01) | |
| *F24F 11/64* | (2018.01) | |
| *F24F 11/65* | (2018.01) | |
| *G05B 19/042* | (2006.01) | |
| *F24F 110/12* | (2018.01) | |
| *F24F 130/00* | (2018.01) | |
| *F24F 130/10* | (2018.01) | |
| *F24F 110/10* | (2018.01) | |

(52) U.S. Cl.
CPC .............. *F24F 11/38* (2018.01); *F24F 11/58* (2018.01); *F24F 11/64* (2018.01); *F24F 11/65* (2018.01); *G05B 19/042* (2013.01); *F24F 2110/10* (2018.01); *F24F 2110/12* (2018.01); *F24F 2130/00* (2018.01); *F24F 2130/10* (2018.01); *G05B 2219/2614* (2013.01)

(58) Field of Classification Search
CPC .. F24F 11/38; F24F 11/58; F24F 11/64; F24F 11/65; F24F 2110/12; F24F 2130/00; F24F 2130/10; F24F 2110/10; G05B 19/042; G05B 2219/2614
See application file for complete search history.

(56) References Cited

U.S. PATENT DOCUMENTS

| | | |
|---|---|---|
| 5,036,455 A | 7/1991 | Atwood |
| 5,664,089 A | 9/1997 | Byers et al. |
| 6,597,073 B1 | 7/2003 | Check |
| 6,703,722 B2 | 3/2004 | Christensen |
| RE39,710 E | 7/2007 | Young et al. |
| 7,349,829 B1 | 3/2008 | Lawlor et al. |
| 7,432,615 B2 | 10/2008 | Hjort |
| 7,508,093 B2 | 3/2009 | Wiedemuth et al. |
| 7,709,975 B2 | 5/2010 | Kuo |
| 8,212,401 B2 | 7/2012 | Linkhart et al. |

(Continued)

*Primary Examiner* — Ramesh B Patel
(74) *Attorney, Agent, or Firm* — Cantor Colburn LLP

(57) ABSTRACT

Systems and methods for obtaining environmental data for an HVAC system are provided. Aspects include a housing, a transceiver, at least one environmental sensor, and a controller coupled to a memory, the controller configured determine a state of the at least one environmental sensor. And based at least in part on the state of the at least one environmental sensor being a failure state, obtain proximate environmental data.

16 Claims, 3 Drawing Sheets

(56) References Cited

U.S. PATENT DOCUMENTS

| | | | |
|---|---|---|---|
| 8,295,950 B1 | 10/2012 | Wordsworth et al. | |
| 8,421,270 B1 | 4/2013 | Miller et al. | |
| 8,738,268 B2 | 5/2014 | Karimi et al. | |
| 9,331,479 B2 | 5/2016 | Imai et al. | |
| 9,444,356 B2 | 9/2016 | Emoto et al. | |
| 9,640,061 B1* | 5/2017 | Klimanis | H04B 11/00 |
| 9,673,624 B2 | 6/2017 | Emoto et al. | |
| 9,696,052 B2* | 7/2017 | Malchiondo | F24F 11/30 |
| 9,762,058 B2 | 9/2017 | Youn et al. | |
| 9,787,181 B2 | 10/2017 | Hasegawa et al. | |
| 9,905,122 B2* | 2/2018 | Sloo | G08B 21/182 |
| 2012/0253527 A1* | 10/2012 | Hietala | F24F 11/30 |
| | | | 700/278 |
| 2012/0305661 A1* | 12/2012 | Malchiondo | F24F 11/74 |
| | | | 236/44 A |
| 2013/0257159 A1 | 10/2013 | Tian et al. | |
| 2014/0083672 A1* | 3/2014 | Rollinson | B60H 1/00764 |
| | | | 165/202 |
| 2015/0061859 A1* | 3/2015 | Matsuoka | G08B 27/00 |
| | | | 340/501 |
| 2015/0061878 A1* | 3/2015 | Kates | H04B 1/69 |
| | | | 340/628 |
| 2015/0096352 A1* | 4/2015 | Peterson | G08B 21/182 |
| | | | 73/31.02 |
| 2015/0116106 A1* | 4/2015 | Fadell | G08B 19/005 |
| | | | 340/501 |
| 2015/0370615 A1* | 12/2015 | Pi-Sunyer | G05D 23/1917 |
| | | | 700/276 |
| 2016/0091217 A1* | 3/2016 | Verberkt | F24F 11/30 |
| | | | 700/276 |
| 2016/0095188 A1* | 3/2016 | Verberkt | G05B 15/02 |
| | | | 315/151 |
| 2016/0379768 A1 | 12/2016 | Pham et al. | |
| 2017/0223807 A1* | 8/2017 | Recker | H02J 13/00017 |
| 2017/0234562 A1* | 8/2017 | Ribbich | G05D 23/1923 |
| | | | 700/277 |
| 2018/0158315 A1* | 6/2018 | Sloo | F24F 11/33 |
| 2019/0066406 A1* | 2/2019 | Sarwar | G07C 5/0808 |

* cited by examiner

HVAC SYSTEM CONTROLLER AND METHOD FOR OBTAINING ENVIRONMENTAL DATA FOR HVAC SYSTEM

CROSS-REFERENCE TO RELATED APPLICATIONS

This application claims the benefit of Indian provisional application no. 201811012727 filed Apr. 3, 2018, which is incorporated herein by reference in its entirety.

BACKGROUND

Exemplary embodiments pertain to the art of heating, ventilation, an air conditioning (HVAC) systems and more particularly to obtaining outside air temperature in an HVAC system.

In existing thermostats for heating, ventilation, and air conditioning (HVAC) systems, an outside air temperature (OAT) sensor failure can result in the shutting down of an outdoor unit in the HVAC system until a service technician is able to replace the faulty OAT sensor. With the outdoor unit shut down, a customer will experience discomfort due to not having access to the HVAC system. A need exists to provide OAT data to an outdoor unit in an HVAC system when an OAT sensor fails.

BRIEF DESCRIPTION

According to one embodiment, a heating, ventilation, and air conditioning (HVAC) system controller is provided. The system controller may include a housing, a transceiver, at least one environmental sensor, and a controller coupled to a memory, the controller configured to determine a state of the at least one environmental sensor. And based at least in part on the state of the at least one environmental sensor being a failure state, obtain proximate environmental data.

In addition to one or more of the features described above, or as an alternative, further embodiments of the system controller may include that the controller is further configured to transmit, by the transceiver, a request for proximate environmental data from a server and receive the proximate environmental data from the server.

In addition to one or more of the features described above, or as an alternative, further embodiments of the system controller may include that the controller is further configured to transmit geographical data to the server, wherein the geographical data comprises a geographical location of the controller.

In addition to one or more of the features described above, or as an alternative, further embodiments of the system controller may include a global positioning system (GPS) sensor in communication with the controller and wherein the geographical data includes GPS data from the GPS sensor.

In addition to one or more of the features described above, or as an alternative, further embodiments of the system controller may include that the geographical data comprises a geographic location stored in a profile associated with the controller.

In addition to one or more of the features described above, or as an alternative, further embodiments of the system controller may include that the controller is configured to obtain proximate environmental data from a proximate thermostat.

In addition to one or more of the features described above, or as an alternative, further embodiments of the system controller may include that the controller is configured to obtain proximate environmental data from a server storing environmental data associated with a geographical location of the controller.

In addition to one or more of the features described above, or as an alternative, further embodiments of the system controller may include that the controller includes a thermostat.

According to one embodiment, a method for obtaining outside air temperature for an HVAC system including one or more thermostats in communication with a server, is provided. The method may include operating at least one thermostat to transmit geographical data of the at least one thermostat and request for environmental data to the server. The server operating to analyze the geographical data and to determine whether one or more thermostats are within close proximity to the requesting thermostat based at least in part on the geographical data. The server operating to obtain proximate environmental data based at least in part on the geographical area and transmit the proximate environmental data to the at least one thermostat.

In addition to one or more of the features described above, or as an alternative, further embodiments of the method may include that obtaining proximate environmental data includes operating the server to identify one or more proximate thermostats in the geographical area and operating the server to obtain the proximate environmental data from the one or more proximate thermostats.

In addition to one or more of the features described above, or as an alternative, further embodiments of the method may include that obtaining proximate environmental data includes operating the server to determine whether any proximate thermostats exist in the geographical area and operating the server to obtain the proximate environmental data from a database storing temperature data associated with the geographical area.

In addition to one or more of the features described above, or as an alternative, further embodiments of the method may include operating the server to provide the proximate environmental data to the at least one thermostat.

In addition to one or more of the features described above, or as an alternative, further embodiments of the method may include that the location data includes global positioning system (GPS) data from a GPS sensor associated with the at least one thermostat.

In addition to one or more of the features described above, or as an alternative, further embodiments of the method may include that the location data includes GPS data from a profile associate with the at least one thermostat.

According to one embodiment, a system is provided. The system may include an HVAC system including a system controller, and at least one environmental sensor in communication with the system controller. The system further includes a server in communication with the HVAC system, wherein the system controller is configured to determine a state of the at least one environmental sensor. And based at least in part on the state of the at least one environmental sensor being a failure state, the system controller obtains proximate environmental data from the server and operates the HVAC system according to the proximate environmental data.

In addition to one or more of the features described above, or as an alternative, further embodiments of the system may include that the system controller is further configured to transmit a request for proximate environmental data from a server and receive the proximate environmental data from the server.

In addition to one or more of the features described above, or as an alternative, further embodiments of the system may include that the system controller is further configured to transmit geographical data to the server, wherein the geographical data includes a geographical location of the system controller.

In addition to one or more of the features described above, or as an alternative, further embodiments of the system may include a global positioning system (GPS) sensor in communication with the system controller and wherein the geographical data includes GPS data from the GPS sensor.

In addition to one or more of the features described above, or as an alternative, further embodiments of the system may include that the geographical data includes a geographic location stored in a profile associated with the system controller.

In addition to one or more of the features described above, or as an alternative, further embodiments of the system may include that the system controller includes a thermostat.

BRIEF DESCRIPTION OF THE DRAWINGS

The following descriptions should not be considered limiting in any way. With reference to the accompanying drawings, like elements are numbered alike.

DETAILED DESCRIPTION

The methods and systems presented herein according to one or more embodiments provide environmental data to an HVAC system when an outside air temperature (OAT) sensor is malfunctioning or inoperable.

Figure 1:
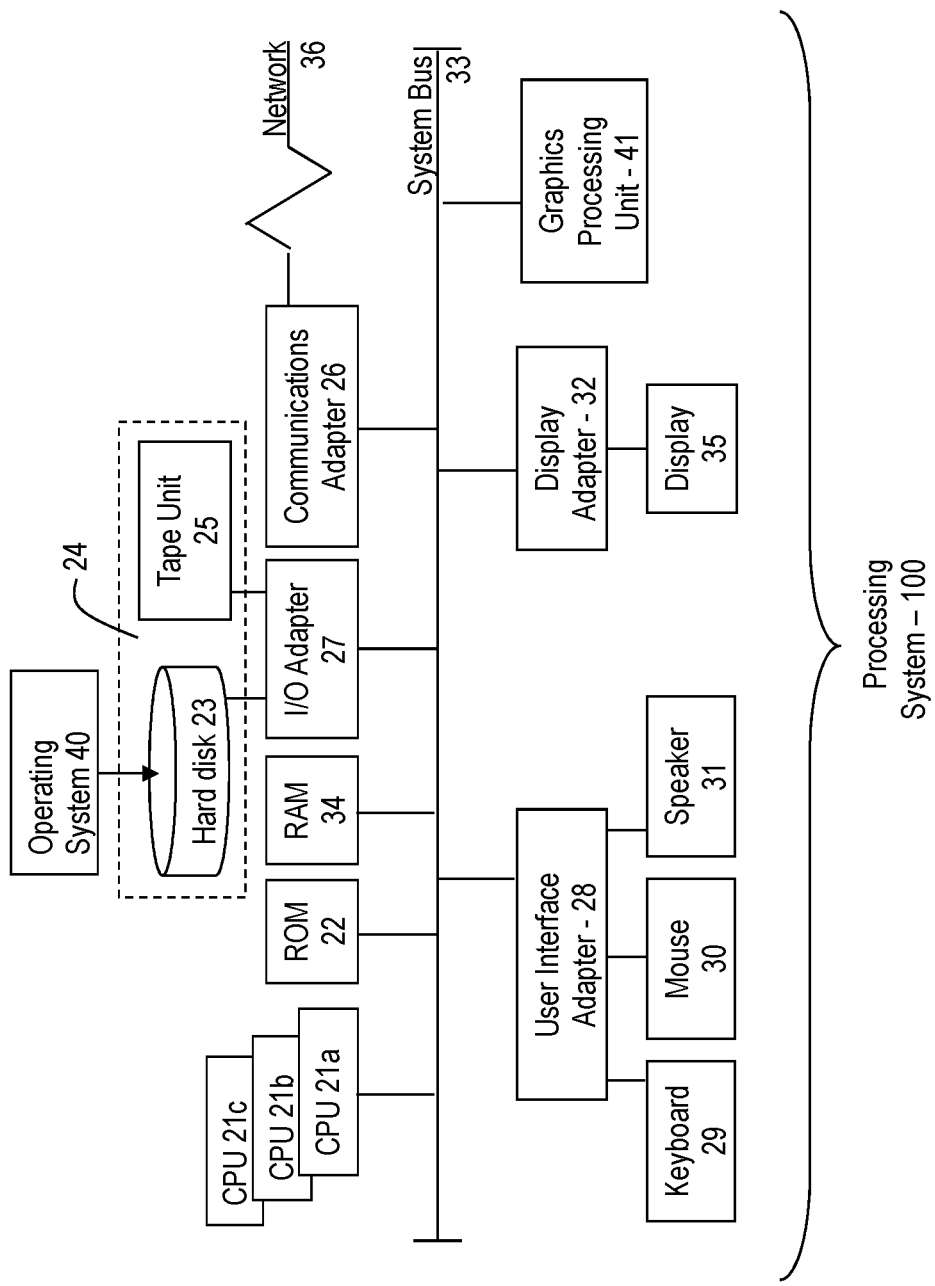
FIG. 1 depicts a block diagram of a computer system for use in implementing one or more embodiments of the disclosure.

Referring to FIG. 1, there is shown an embodiment of a processing system 100 for implementing the teachings herein. In this embodiment, the system 100 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 100.

FIG. 1 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 100 may be stored in mass storage 24. A network adapter 26 interconnects bus 33 with an outside network 36 enabling data processing system 100 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 100 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel. The processing system 100 described herein is merely exemplary and not intended to limit the application, uses, and/or technical scope of the present disclosure, which can be embodied in various forms known in the art.

Thus, as configured in FIG. 1, the system 100 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system to coordinate the functions of the various components shown in FIG. 1. FIG. 1 is merely a non-limiting example presented for illustrative and explanatory purposes. In one or more embodiments, any embedded computing platform can be utilized.

The computing systems 100 may be used to execute or perform embodiments and/or processes described herein, such as within and/or on a smart device and/or thermostat controlling an HVAC system.

Turning now to an overview of technologies that are more specifically relevant to aspects of the invention, smart technology devices such as internet of things (IoT) objects have been incorporated in every day systems to connect otherwise electronically isolated objects or devices to either other IoT objects or to the internet. For example, a thermostat controlling an HVAC system can be wired to a local internet connection to communicate with other devices, such as, for example, other thermostats and HVAC systems or can connect to external servers. The term Internet of Things (IoT) object is used herein to refer to any object (e.g., thermostat, etc.) that has an addressable interface (e.g., an Internet protocol (IP) address, a Bluetooth identifier (ID), a near-field communication (NFC) ID, etc.) and can transmit information to one or more other objects over a wired or wireless connection. An IoT object may have a passive communication interface, such as a quick response (QR) code, a radio-frequency identification (RFID) tag, an NFC tag, or the like, or an active communication interface, such as a modem, a transceiver, a transmitter-receiver, or the like. An IoT object can have a particular set of attributes (e.g., a device state or status, such as whether the IoT object is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet.

HVAC systems rely on thermostats and sensor technology (IoT objects) to assist with regulation of temperature inside different zones within a house, for example. However, issues arise with the failure or malfunctioning of sensors, particularly, the outside air temperature (OAT) sensor. The OAT sensor determines outside air temperatures for utilization in the HVAC system. When an OAT sensor malfunctions and needs to be replace, the HVAC system is, typically, still being utilized. Replacement and installation can take days to schedule a part and a technician to arrive on site and service the OAT sensor. Currently, HVAC systems utilize an on-board thermistor to "back-up" the OAT sensor during failure. However, thermistors can be in-accurate and can cause performance issues with the HVAC system.

One or more embodiments of the present disclosure address the above-described shortcomings of the prior art by providing a method for obtaining OAT data and humidity data from a nearby (proximate) HVAC system and/or from a cloud server based on the geographic area of the requesting thermostat.

Figure 2:
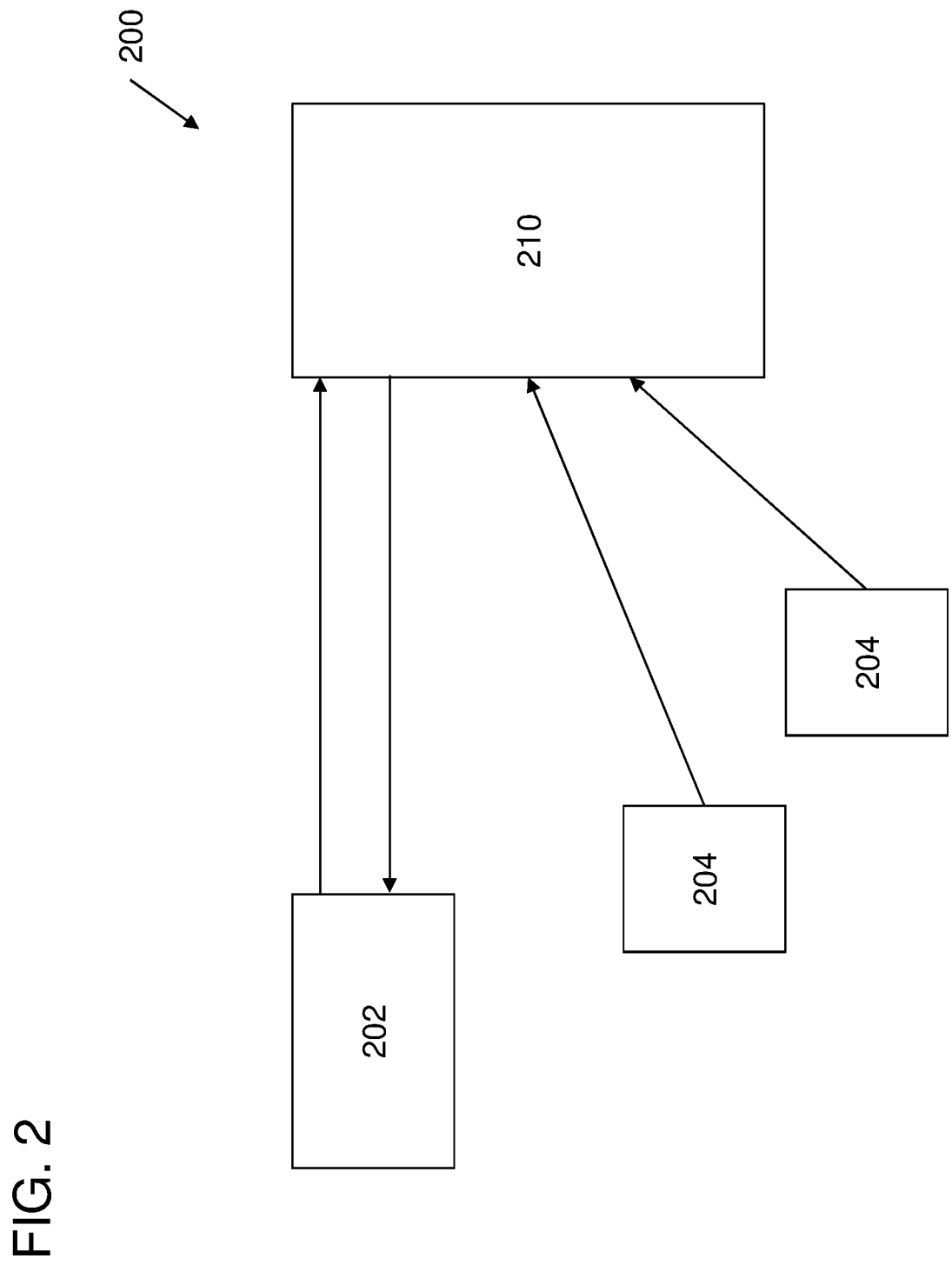
FIG. 2 is a block diagram of a system for obtaining outside air temperature data according to one or more embodiments of the disclosure.

Turning now to a more detailed description of aspects of the present disclosure, FIG. 2 depicts a block diagram of a system for obtaining outside air temperature data according to one or more embodiments. The system 200 includes a requesting thermostat 202, proximate thermostats 204, and a server 210. In one or more embodiments the requesting thermostat 202 and proximate thermostats 204 can include one or more controllers coupled to a memory. The requesting thermostat 202 and proximate thermostats 204 can be configured to operate one or more components within a heating, ventilation, and air conditioning (HVAC) systems. The thermostats 202, 204 can communicate with the server 210 through a transceiver, network connection, or any other means.

In one or more embodiments, the components of the thermostats 202, 204 and server 210 can be implemented on the processing system 100 found in FIG. 1. Additionally, a cloud computing system can be in wired or wireless electronic communication with one or all of the elements of the system 200. Cloud computing can supplement, support or replace some or all of the functionality of the elements of the system 200. Additionally, some or all of the functionality of the elements of system 200 can be implemented as a node of a cloud computing system.

In one or more embodiments, the requesting thermostat 202 and proximate thermostats 204 include sensors capable of obtaining environmental data, such as outside air temperature (OAT) data and humidity data to name a couple of non-limiting examples. This environmental data is utilized for adjusting parameters for the HVAC system. For example, to maintain a constant inside temperature in a residential home, as outside air temperatures increase, the thermostats can engage the HVAC system to keep the temperature on the inside constant. The sensors can sometimes fail or malfunction which can cause performance issues related to the HVAC system. In the case of a sensor failure for a requesting thermostat 202, the controller can transmit a request for OAT data and humidity data from the server 210. This request can include location data associated with the requesting thermostat 202 such as global positioning system (GPS) data which indicates the location of the requesting thermostat within a geographic area. Based on this request for OAT data and humidity data, the server 210 can transmit proximate OAT data and humidity data for the particular geographic area of the requesting thermostat 202. This proximate OAT data can be obtained by the server 210 from the proximate thermostats 204 that are based in the same geographic area as the requesting thermostat 202. The geographic area can be an area such as the same zip code or city as the requesting thermostat 202 or the geographic area can be within a certain distance from the requesting thermostat 202. For example, a geographic area can be defined by a radius of three miles from the requesting thermostat 202. The server 210 can obtain OAT data and humidity data from the proximate thermostats 204 that are located within the specified geographic area.

In one or more embodiments, the server 210 can obtain environmental data from other sources such as weather applications based on the geographic location of the thermostat. If no proximate thermostats 204 are within the geographic area, the requesting thermostat 202 transmits geographical data, such as town or zip code, to the server 210. The server 210 accesses the weather application to obtain proximate environmental data, such as OAT data and humidity data, based on the transmitted geographical data. After obtaining the proximate environmental data, the server transmits the environmental data to the requesting thermostat 202.

In one or more embodiments, the server 210 obtains environmental data (e.g., OAT data and humidity data) from the closest proximate thermostat 204 to the requesting thermostat 202. The requesting thermostat 202 location can be included in a profile of the requesting thermostat 202 when installed by a technician. For example, the profile can include an address or zip code for the requesting thermostat 202. Then the request for environmental data is sent to the server 210, the server 210 can access the profile and return environmental data to the requesting thermostat 202 based on the profile data. In one or more embodiments, the proximate thermostats 204 can have profiles including address, zip code, or other geographical data. The server 210, when pulling environmental data from the proximate thermostats 204 can identify the proximate thermostat 204 closest to the requesting thermostat 202. In one or more embodiments, the server 210 can identify multiple proximate thermostats 204 within a certain geographic region and take an average of the OAT data and send to the requesting thermostat 202.

In one or more embodiments, the server 210 can obtain data about geographic regions where a requesting thermostat 202 and proximate thermostats 204 are located. For example, certain regions might have elevated pollution levels because there is a highway nearby. Or a region might have elevated heat because of the presence of excessive asphalt in the area. Urban areas may have elevated temperatures versus rural areas, as well. The server 210, when collecting environmental data from proximate thermostats 204 can utilize this data about the geographic regions. For example, the server 210 might have access to two proximate thermostats 204 that are substantially equidistance from the requesting thermostat 202. However, one proximate thermostat might be located in a densely populated town or city and the other proximate thermostat might be located in a lightly populated rural area. Based on the geographic region of the requesting thermostat 202, the server 210 can return the OAT data that best matches the geographic location of the requesting thermostat 202. For example, the requesting thermostat 202 can be located in an area with a lot tree cover and vegetation that would return cooler temperatures as compared to an area that has very little vegetation. A proximate thermostat 204 in a similar area (e.g., lush vegetation) would be utilized to provide OAT data to the requesting thermostat 202.

Figure 3:
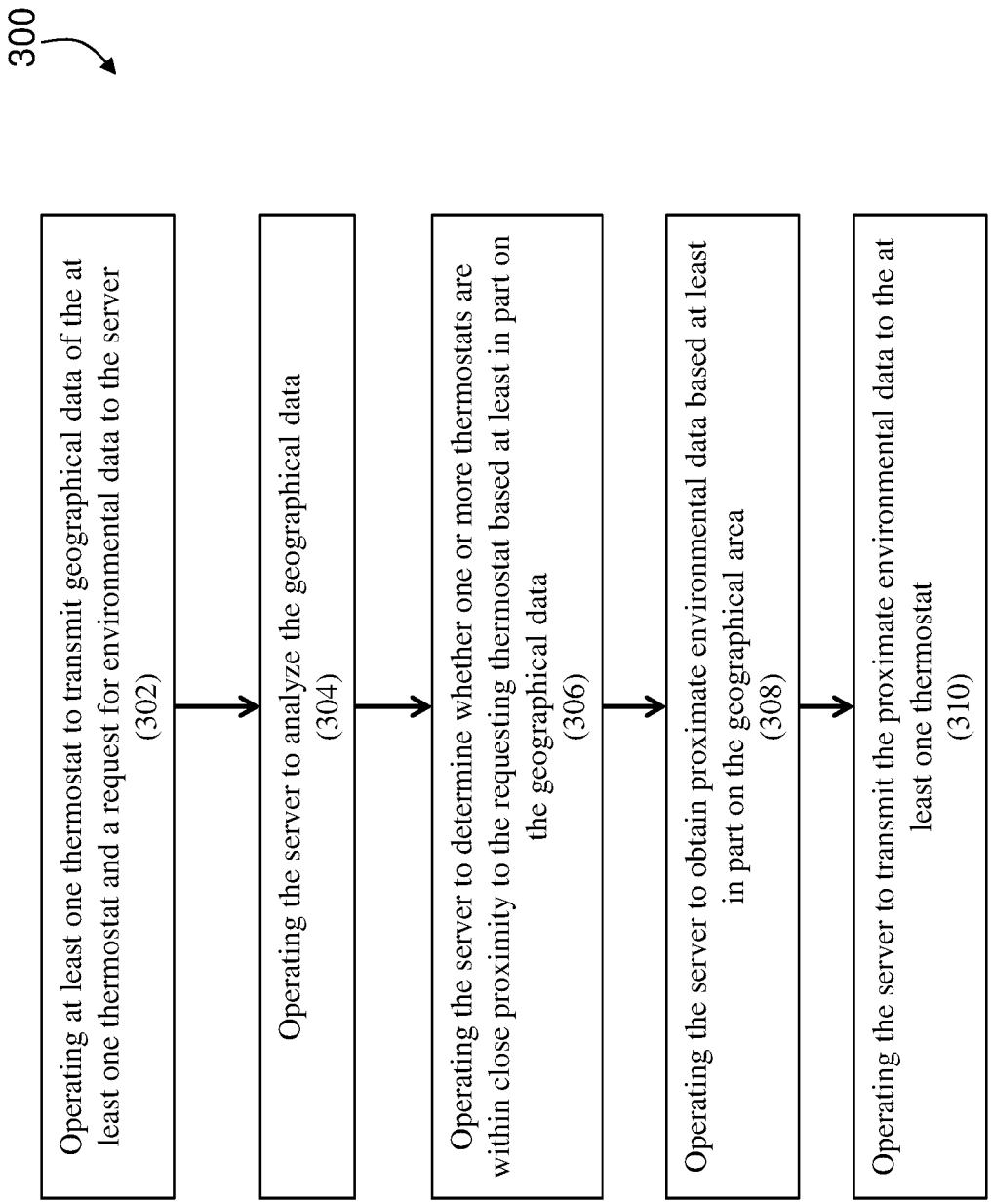
FIG. 3 is a flow diagram of a method for obtaining outside air temperature data for heating, ventilation and air-conditioning (HVAC) systems according to one or more embodiments of the present disclosure.

FIG. 3 depicts a block diagram of a method for obtaining outside air temperature data for heating, ventilation and air-conditioning (HVAC) systems according to one or more embodiments of the present disclosure. The method 300 includes operating at least one thermostat to transmit geographical data of the at least one thermostat and a request for environmental data to the server, as shown at block 302. At block 304, the method 300 includes operating the server to analyze the geographical data. And, at block 306, the method 300 includes operating the server to determine whether one or more thermostats are proximate to the requesting thermostat based at least in part on the geographical data. The method 300, at block 308, includes operating the server to obtain proximate environmental data based at least in part on the geographical area. And, at block 310, the method 300 includes operating the server to transmit the proximate environmental data to the at least one thermostat.

Additional processes may also be included. It should be understood that the processes depicted in FIG. 3 represent illustrations, and that other processes may be added or existing processes may be removed, modified, or rearranged without departing from the scope and spirit of the present disclosure.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An HVAC system controller comprising:
   a housing;
   a transceiver;
   at least one environmental sensor configured to sense outdoor air temperature; and
   a controller coupled to a memory, the controller configured to:
      determine a state of the at least one environmental sensor; and
      based at least in part on the state of the at least one environmental sensor being a failure state, obtain proximate environmental data;
   wherein obtaining the proximate environmental data includes the controller:
      transmitting, by the transceiver, geographical data and a request for proximate environmental data to the server, wherein the geographical data comprises a geographical location of the HVAC system controller to a server; and
      receiving the proximate environmental data from the server, wherein the proximate environmental data includes proximate outdoor air temperature.

2. The HVAC system controller of claim 1 further comprising:
   a global positioning system (GPS) sensor in communication with the controller; and
   wherein the geographical data includes GPS data from the GPS sensor.

3. The HVAC system controller of claim 1, wherein the geographical data comprises a geographic location stored in a profile associated with the HVAC system controller.

4. The HVAC system controller of claim 1, wherein the controller is configured to obtain proximate environmental data from a proximate HVAC system controller.

5. The HVAC system controller of claim 1, wherein the controller is configured to obtain proximate environmental data from a server storing environmental data associated with a geographical location of the HVAC system controller.

6. The HVAC system controller of claim 1, wherein the controller comprises a thermostat.

7. A method for obtaining environmental data for an HVAC system, the HVAC system comprising one or more thermostats in communication with a server, the method comprising:
   determining that an outdoor air temperature sensor has experienced a failure;
   in response to the outdoor air temperature sensor experiencing a failure, operating at least one thermostat to transmit geographical data of the at least one thermostat and a request for environmental data to the server;
   operating the server to analyze the geographical data;
   operating the server to locate one or more thermostats proximate to the requesting thermostat based at least in part on the geographical data;
   operating the server to obtain proximate environmental data based at least in part on the geographical area; and
   operating the server to transmit the proximate environmental data to the at least one thermostat;
   wherein the proximate environmental data includes proximate outdoor air temperature.

8. The method of claim 7, wherein obtaining proximate environmental data comprises:
   operating the server to obtain the proximate environmental data from the one or more thermostats proximate to the requesting thermostat.

9. The method of claim 7, wherein obtaining proximate environmental data comprises:

operating the server to obtain the proximate environmental data from a database storing temperature data associated with the geographical area.

10. The method of claim 7, wherein the geographical data comprises global positioning system (GPS) data from a GPS sensor associated with the at least one thermostat.

11. The method of claim 7, wherein the geographical data comprises GPS data from a profile associated with the at least one thermostat.

12. A system comprising:
an HVAC system, the HVAC system comprising a system controller, and at least one environmental sensor in communication with the system controller, the at least one environmental sensor sensing outdoor air temperature;
a server in communication with the HVAC system;
wherein the system controller is configured to:
determine a state of the at least one environmental sensor; and
based at least in part on the state of the at least one environmental sensor being a failure state, obtain proximate environmental data from the server;
operate the HVAC system according to the proximate environmental data;
wherein obtaining the proximate environmental data includes the controller:
transmitting, by the transceiver, geographical data and a request for proximate environmental data to the server, wherein the geographical data comprises a geographical location of the HVAC system controller to a server; and
receiving the proximate environmental data from the server, wherein the proximate environmental data includes proximate outdoor air temperature.

13. The system of claim 12 further comprising:
a global positioning system (GPS) sensor in communication with the system controller; and
wherein the geographical data includes GPS data from the GPS sensor.

14. The system of claim 13, wherein the geographical data comprises a geographic location stored in a profile associated with the system controller.

15. The system of claim 12, wherein the system controller is configured to obtain proximate environmental data from a proximate system controller.

16. The system of claim 12, wherein the system controller comprises a thermostat.

* * * * *